United States Patent [19]

Bright

[11] 4,066,042
[45] Jan. 3, 1978

[54] HOLLOW PLASTIC COOP DOWELS WITH WOOD CORE

[76] Inventor: Charles R. Bright, 805 Spring Valley Drive, Nacogdoches, Tex. 75961

[21] Appl. No.: 652,814

[22] Filed: Jan. 27, 1976

[51] Int. Cl.² ............................................. A01K 31/07
[52] U.S. Cl. ........................................ 119/19; 217/36
[58] Field of Search ...................... 119/17, 19, 23, 18; 52/725, 106, 727, 728; 220/71, 73, 346, 84; 217/36, 57, 42; 403/173, 231; 256/65, 66; 46/27, 28, 29; 312/257 SK

[56] References Cited

U.S. PATENT DOCUMENTS

| 1,522,815 | 1/1925 | George | 119/23 |
| 2,619,249 | 11/1952 | Whittington | 220/84 |
| 3,095,992 | 7/1963 | Shreckhise | 119/19 |
| 3,802,391 | 4/1974 | Peeler | 119/19 |
| 3,936,111 | 2/1976 | Mazzucconi | 403/173 |

Primary Examiner—Russell R. Kinsey
Assistant Examiner—Peter K. Skiff
Attorney, Agent, or Firm—Clarence A. O'Brien; Harvey B. Jacobson

[57] ABSTRACT

An improved poultry coop for holding and transporting chickens, and the like, having improved dowel construction of double layer compartmentalized rigid polyvinyl chloride jackets with hardwood dowel cores. Two of such improved dowels are provided in each corner and one in the center of each end and side frame. The dowels increase substantially the strength and life of the coop, especially when used with mechanical devices for lifting and transporting.

7 Claims, 4 Drawing Figures

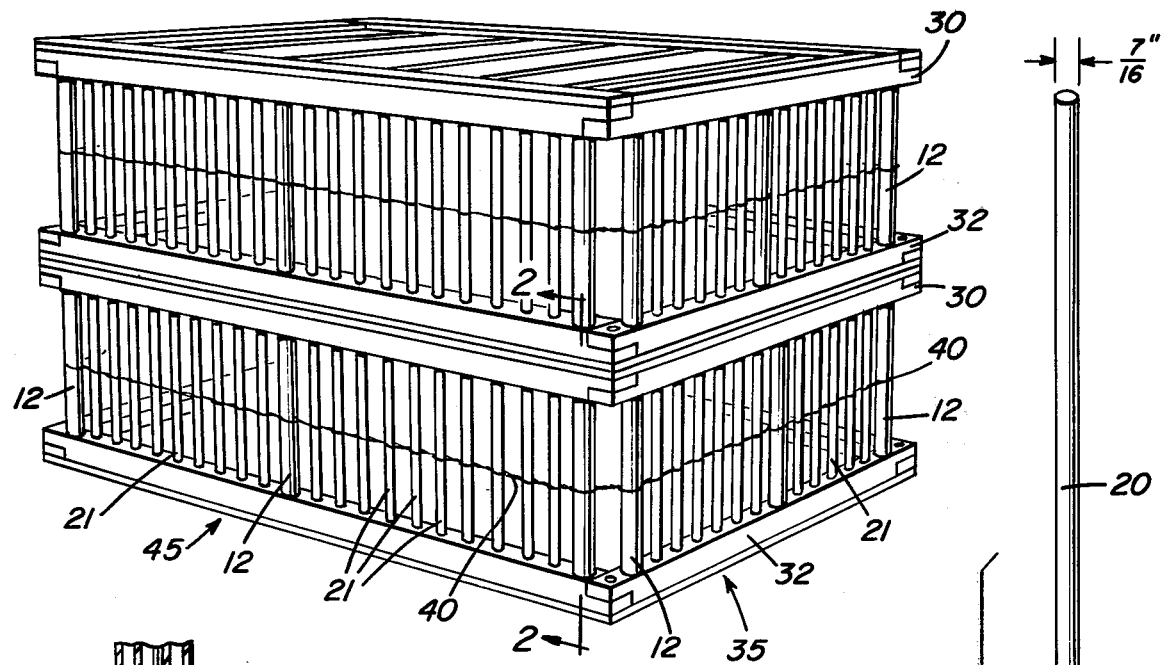
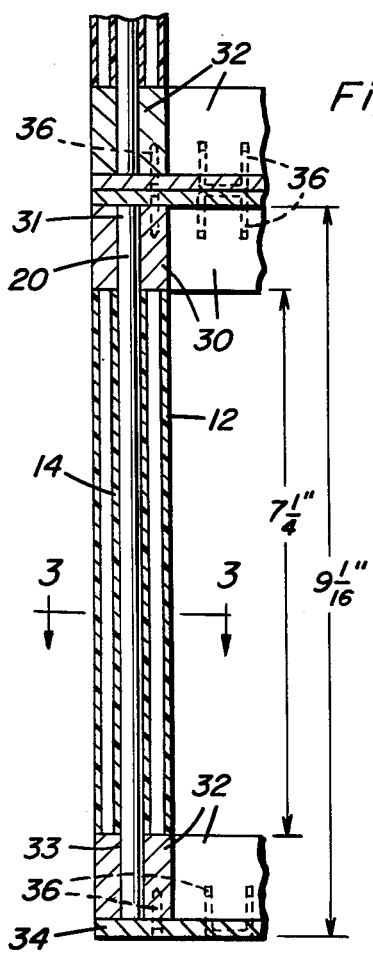
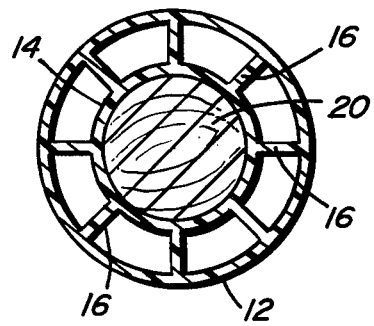
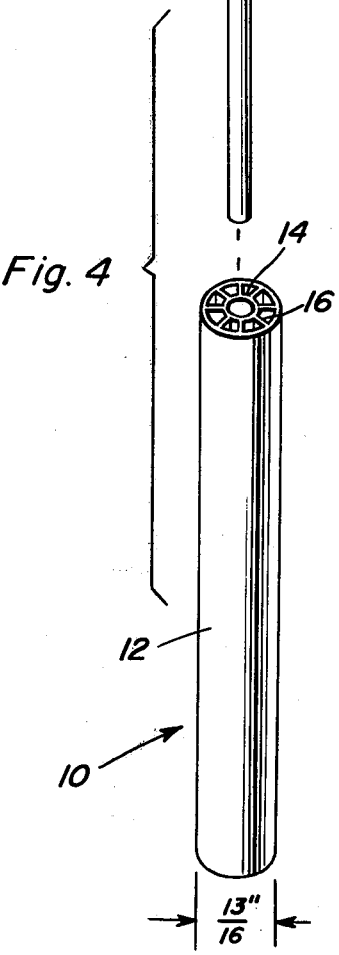

HOLLOW PLASTIC COOP DOWELS WITH WOOD CORE

BACKGROUND OF THE INVENTION

1. Field of the Invention

This invention relates generally to poultry coops used in the industry for transporting chickens, and the like, with the primary improvement being in the construction of the coop itself.

2. Description of the Prior Art

A common problem with known coops for poultry is that they do not stand-up under the modern day use of mechanical devices for loading and unloading, and transporting of same.

Conventional type poultry coops when used with the new mechanical devices such as "squeeze lift" and "fork lifts" now common to our poultry industry, create a lot more wear and tear on conventional type coops. With the use of this modern type equipment it is common to stack many more coops on top of each other than ever before and by the use of this mechanized equipment, the stacked coops can still be moved and transported. This is fine for increasing the productivity during the working day but does increase the stress and strain on the coops themselves.

Known prior patents which may be pertinent to this invention are as follows:

U.S. Pat. Nos. 3,095,992 July 2, 1963, 3,442,418 May 6, 1969, 3,451,452 June 24, 1969, 3,687,330 Aug. 29, 1972, 3,802,391 Apr. 9, 1974.

None of these known prior art devices offers the new and unique features of the invention disclosed herein.

SUMMARY OF THE INVENTION

An object of the present invention is to provide an improved poultry coop which will have longer life, reduced maintenance and repairs, and have substantially greater strength.

Another object of the present invention is to provide a coop for poultry and the like having outdoor-type rigid polyvinyl chloride jackets over hardwood dowel cores at selected points of said coop.

A further object of this invention is to provide an improved poultry coop having at least two PVC-hardwood dowel cores for each corner, together with one in the center of each of the side frames and each of the end frames.

A still further object of this invention is to provide a reinforced coop for poultry and the like which utilizes reinforced dowels in the sides and on the ends of the frame portion together with reinforcing wire for securing all of the side elements and end elements securely together.

The poultry coop disclosed herein has many advantages over known conventional type coops. An important advantage of this improved coop is that it can be stacked with more coops per stack than normal and will not cause the coops on the bottom of the stack to collapse or become damaged.

Another important feature is that the coops of this invention resist shear to a greater extent than conventional type coops and also have more flexibility than conventional type coops. This will allow them to be used with new mechanized loading and unloading and transporting devices without danger of damage to said coops.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of two of the coops of this invention as commonly stacked in use.

FIG. 2 is a cross-sectional view taken generally along the line 2—2 of FIG. 1.

FIG. 3 is a cross-sectional view taken generally along the line 3—3 of FIG. 2.

FIG. 4 is an exploded, perspective view of the new and improved dowel for use with a poultry coop as shown.

DESCRIPTION OF THE PREFERRED EMBODIMENT

Referring to FIG. 4 of the drawings, reference numeral 10 indicates the exploded view of the dowel as used with the improved poultry coop of this invention. The improved dowel has an outer jacket 12 of tubular cross-section and an inner tubular member 14. As best seen in FIG. 3, the space between the outer jacket 12 and the inner jacket 14 is suitably compartmentalized by means of partitions 16. The partitions 16 extend the entire length of the jacket members and greatly increase the strength of either jacket in its individual configuration.

The jacket combination, i.e., 12, 14 and 16, is formed of outdoortype rigid polyvinyl chloride (PVC) type material. Normally the entire strengthening jacket combination would be extruded as one complete structure from appropriate plastic extruding machines.

The jacket structure is normally used with hardwood dowels 20 which are slightly longer in length than the jacket itself, as best seen in the cross-sectional view of FIG. 2. The coop construction with which the improved dowels are used consist of top frames 30, bottom frames 32, and hard board, masonite, or other type material 34, appropriately stapled 36 or otherwise fastened to the frames 30 and 32, as best seen in FIG. 2, and the top and bottom frames have holes 31 and 33 appropriately spaced around the perimeter edge of the respective frames. The dowel 20 being longer than the PVC jackets is fed into the spaced holes 31 and 33, as seen in FIG. 2 and the jackets 12, 14 and 16 function as strengtheners and spacers. Tops are also provided for the top frames 30 in a conventional manner, as are opening and closing means for access to the interior of the coop. Of course, a center dowel 20 of material other than hardwood, such as PVC or other plastic material, may be used with the jacket structure.

Appropriately fastened by wire twisting or other convenient means is a reinforcing wire 40 between the normal dowel sides of the end and side frames 35 and 45, respectively. The reinforcing wire 40 connects between the mid-points of the regular type dowels 21 and the outer jackets 12 of the reinforced dowels. Each side panel 45 has at least one of the strengthened dowel structures at each end thereof and one at the middle. Similarly, the end frames have a strengthened dowel unit at each end and one in the middle. Thus, when the over-all coop is assembled, there will be two reinforced and strengthened dowel structures at each corner of the coop with one in the middle of each of the four sides.

This together with the wire reinforcement greatly improves the resistance of the entire coop to damage and destruction.

Sizes for the components found to be acceptable in use are a diameter of approximately seven-sixteenths of an inch for dowel 20 and 9 1/6 inches in length. The dimension for the jackets or PVC shells are preferably thirteen-sixteenths of an inch outer diameter, approximately seven-sixteenths of an inch inner diameter thereby assuring a snug fit with the wood dowel, and an over-all length of approximately 7¼ inches.

From the above description, it can readily be seen how the improved dowel construction greatly increases the over-all strength of the poultry coop and greatly increases the manner of use of said coop in the industry.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A coop for poultry and the like having top and bottom panels of wood or like material, opening means for access to the interior of said coop, two side panel frame members and two end panel frame members appropriately formed by spaced dowel construction between the top and bottom panels, the end and side panels each including a number of dowels spaced along the periphery of the frame members, the improvement comprising; means to substantially increase the strength of the over-all coop and reduce repair and maintenance required on same, including reinforcing structure to cover selected ones of the dowels, said reinforcing structure including double layer compartmentalized tubing structure of sufficient length to extend between and in positive contact with the top and bottom panels, the tubing structure further including an inner tube spaced from an outer tube by means of longitudinal spacers extending radially between the outer side of the inner tube and the inner side of the outer tube with said entire structure being formed of plastic material, and additional means between at least some of the dowels and the reinforcing structure for substantially reinforcing the over-all coop construction.

2. The structure as set forth in claim 1 wherein the additional means between at least some of the dowels for reinforcement purposes includes reinforcing wire about each of the dowels at the mid-point thereof and connecting said dowels together with each of said reinforcing double layer compartmentalized tubing structures.

3. The structure as set forth in claim 2 wherein at least one of said reinforcing double layer compartmentalized tubing structures is used at each corner of the coop.

4. The structure as set forth in claim 3 wherein each of the two end panel frame members and each of the two side panel frame members include one reinforcing double layer compartmentalized tubing structure at each corner end thereof and one between said corner ends at the middle of said panels so that the over-all coop contains a total of twelve reinforced tubing structures.

5. The structure as set forth in claim 4 wherein the tubing structures are extruded from outdoor-type rigid polyvinyl chloride material.

6. The structure as set forth in claim 5 together with the reinforcing double layer compartmentalized tubing structures having an outside diameter of approximately 13/16 inches and the inner dowel diameter being approximately 7/16 inch and snugly fitting the inner portion of the reinforcing jacket, and the inner dowel being of hardwood.

7. The structure as set forth in claim 1 wherein the double layer compartmentalized reinforcing tubing structure is extruded of outdoor-type rigid polyvinyl chloride type material.

* * * * *